Figure 1:
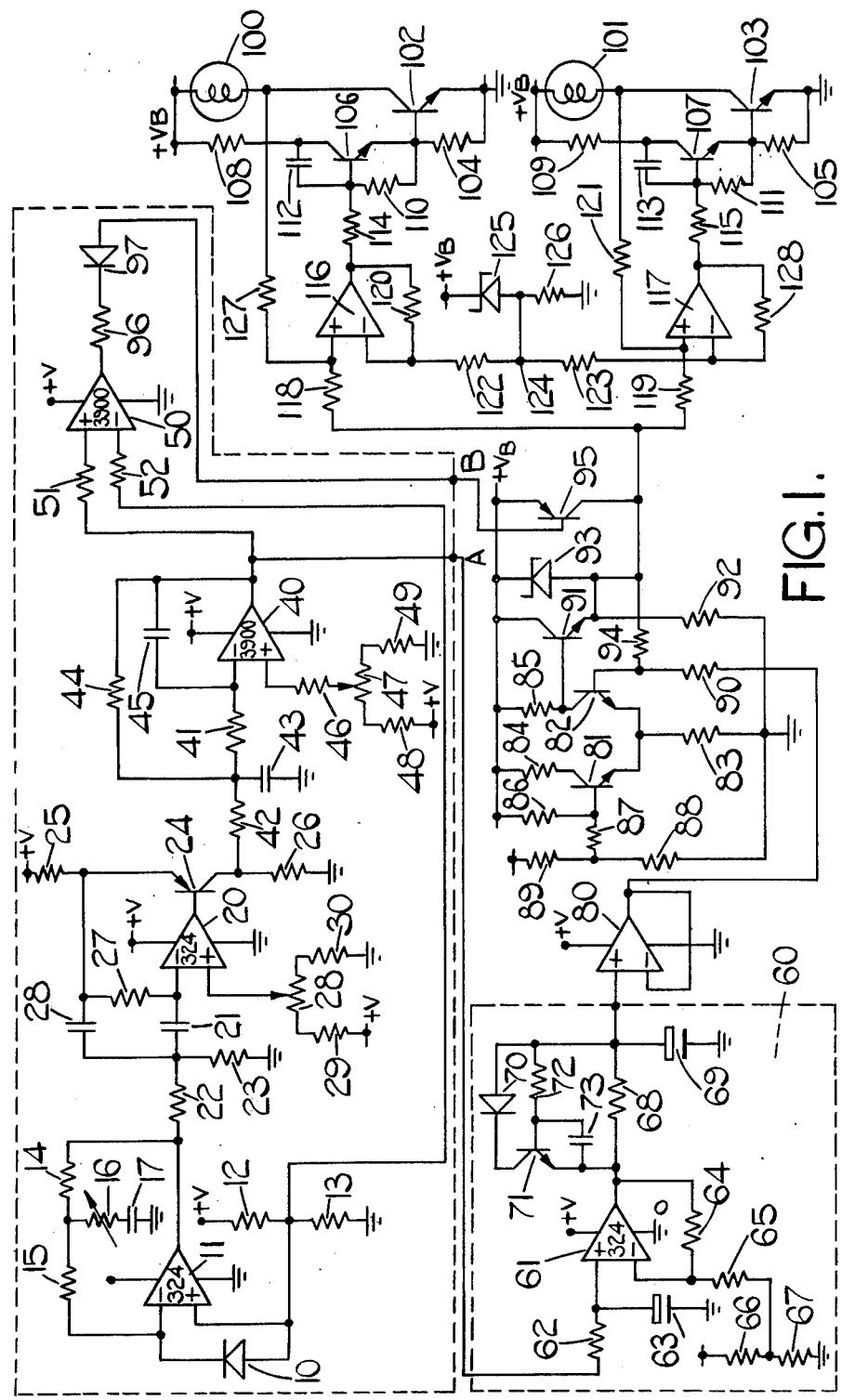

United States Patent [19]

Hodgson et al.

[11] 4,117,453

[45] Sep. 26, 1978

[54] VEHICLE HEADLAMP CONTROL CIRCUITS

[75] Inventors: Duncan Barry Hodgson, Whitnash, near Leamington; John Robert Thornton, Greenlands; Jonathan Rose, Knowle, all of England

[73] Assignee: Lucas Industries Limited, Birmingham, England

[21] Appl. No.: 765,864

[22] Filed: Feb. 4, 1977

[30] Foreign Application Priority Data

Feb. 10, 1976 [GB] United Kingdom ............... 5135/76

[51] Int. Cl.[2] .................. B60Q 1/14; H05B 39/02
[52] U.S. Cl. ............................... 340/76; 315/83; 315/156
[58] Field of Search ............. 315/82, 83, 156–159, 315/77, 83; 340/76; 328/2; 307/10 LS, 117, 128, 129; 250/214 D; 323/21, 22

[56] References Cited

U.S. PATENT DOCUMENTS

| | | | |
|---|---|---|---|
| 3,283,161 | 11/1966 | Ubukata et al. | 315/83 |
| 3,780,340 | 12/1973 | Munro | 315/156 X |
| 3,828,220 | 8/1974 | Moore et al. | 315/156 X |

Primary Examiner—Donald J. Yusko

[57] ABSTRACT

An automatic vehicle headlamp intensity adjustement circuit includes a high sensor. A tuned rectifier circuit for producing a d.c. signal of magnitude dependent on the amplitude of the 50Hz (or other local supply frequency) component of the signal picked up by the sensor. A lamp current modulating circuit is controlled by this d.c. signal through the intermediary of an averaging circuit. The averaging circuit has a relatively long time constant and a timer is connected to reduce this time constant if the d.c. signal continues to fall for more than a predetermined period of time.

10 Claims, 2 Drawing Figures

VEHICLE HEADLAMP CONTROL CIRCUITS

This invention relates to vehicle headlamp control circuits.

One known form of vehicle headlamp control circuit is described in British patent specification No. 1,328,789, in which the circuit described detects incident light and responds only to the a.c. component of the detector output at a frequency twice that of the local street lighting main electricity supply. As the vehicle passes along a lit street, the amplitude of this a.c. component varies between distinct maxima and minima and the circuit described controls the vehicle headlamps in accordance with the amplitude minima.

It has been found, however, that in such a system, the magnitude of the amplitude minima does not necessarily represent a good indication of the overall lighting level.

In accordance with one aspect of the present invention, therefore, the vehicle lighting is controlled in accordance with the average value of the magnitude of the amplitude of the a.c. component.

The time constant of the averaging circuit used to derive the average amplitude signal is of necessity a matter of compromise between the requirement to prevent headlamp modulation at the frequency at which the vehicle passes lampposts and the need to ensure a reasonably fast response to changes in light level.

Modulation of the headlamp intensity as mentioned above can be substantially totally avoided by a further feature of the invention, namely the use of an averaging circuit for providing a control signal in accordance with the average value of the amplitude of the a.c. component referred to, the averaging circuit having a predetermined time constant, a further time constant circuit driven by said averaging circuit and having a significantly longer time constant, and means for bypassing said further time constant circuit when the control signal continues to fall for a period in excess of a predetermined delay.

With such an arrangement the time constant of the further time constant circuit and the predetermined delay can be selected so that there will not be any appreciable change in output of the further time constant circuit in the time taken to pass one or more unilluminated street lamps in an otherwise well lit area. In the system which detects minima distinct modulation of the headlamp intensity would occur in such circumstances.

The use of the further time delay circuit and the bypass means, necessarily involves introducing a delay in increasing the headlamp intensity when the street lighting deteriorates. In a preferred form of the invention a detection circuit is employed to detect when the amplitude of the a.c. component falls below a set level and to override the averaging circuit to increase the headlamp intensity without delay.

Figure 2:
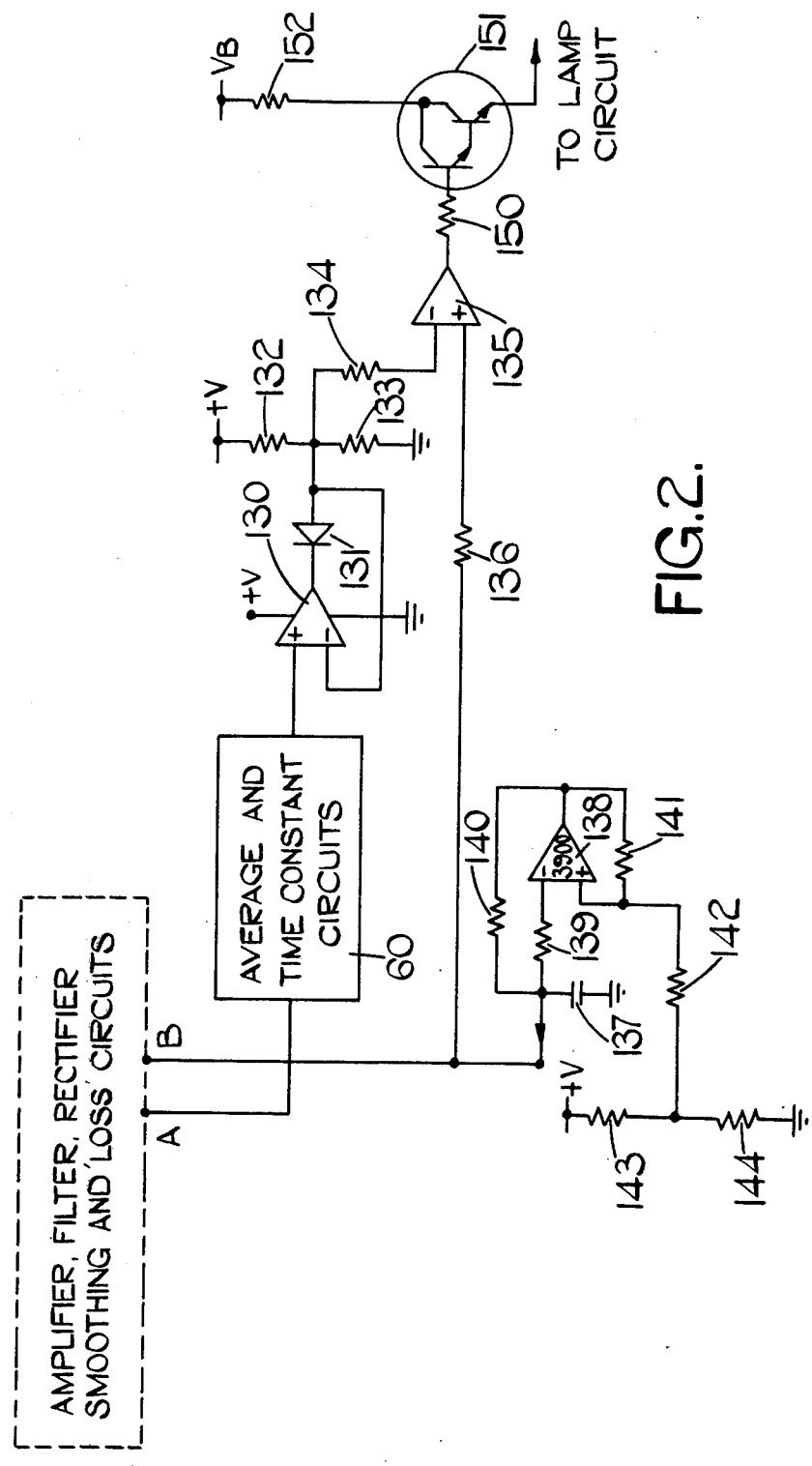

In the accompanying drawings,

FIG. 1 is the circuit diagram of one example of the invention utilising an analogue headlamp intensity control and FIG. 2 is the circuit diagram of another example of the invention utilising a mark-space ratio control.

Referring firstly to FIG. 1, the circuit shown includes a light sensitive diode 10 which has its anode and cathode directly coupled to the respective non-inverting and inverting input terminals of an operational amplifier 11 connected to operate in the inverting mode. The non-inverting input terminal of the amplifier 11 is connected to the midpoint of a potential divider 12, 13 connected between a stabilised supply rail and earth and feedback is provided by a pair of resistors 14, 15 connected in series between the output terminal of the amplifier 11 and its inverting input terminal, the common point of the two resistors being connected via a variable resistor 16 and a capacitor 17 in series to earth. The inclusion of the capacitor 17 reduces d.c. gain but allows a relatively high gain at signal frequencies.

The output terminal of the amplifier 11 is connected to a bandpass filter/rectifier circuit constituted by an operational amplifier 20. The inverting input terminal of this amplifier 20 is connected via capacitor 21 and a resistor 22 in series to the output terminal of the amplifier 11. The common point of the resistor 22 and the capacitor 21 is connected by a resistor 23 to earth and the output terminal of the amplifier 20 is connected to the base of a p-n-p transistor 24 with equal value resistors 25, 26 connecting its emitter and collector to the rail V and earth respectively. The emitter of the transistor 24 is connected by a resistor 27 to the inverting input terminal of the amplifier and by a capacitor 28 to the common point of the resistor 22 and the capacitor 21. The non-inverting input terminal of the amplifier 20 is connected to the variable point of a potentiometer 28 connected in series with padding resistors 29 and 30 between the rail V and earth. The band-pass filter section is tuned to 100 Hz and has a very narrow bandwidth. The output of the amplifier 20 is full wave rectified by the action of transistor 24 such that a full wave rectified signal appears at the collector of transistor 24.

The band-pass filter/full wave rectifier stage is followed by a smoothing filter stage around a current comparator 40. The inverting input terminal of this comparator 40 is connected by two resistors 41, 42 in series to the collector of the transistor 24, with the common point of these resistors connected by a capacitor 43 to earth and by a high value resistor 44 to the output terminal of the comparator 40. A capacitor 45 is connected between the output terminal and the inverting input terminal of the comparator 40. The non-inverting input terminal of the comparator 40 is connected by a resistor 46 to the variable point of a potentiometer 47 connected in series with padding resistors 48, 49 between the rail V and earth. The components of the smoothing filter stage are chosen so that the 200 Hz ripple signal in the full wave rectified output of the band-pass filter/full wave rectifier circuit is substantially completely eliminated, but variations in the d.c. level brought about by fluctuations in the 100 Hz signal level caused by driving past successive street lamps, are not attenuated. Thus the output of the comparator 40 is a d.c. signal which can fluctuate at a low frequency as individual street lamps are passed.

The output of the smoothing filter stage is applied to two separate circuits, namely an "absence of 100 Hz" detector and an average and time constant circuit. The detector circuit comprises a voltage comparator 50 with its non-inverting input terminal connected by a resistor 51 to the output of the comparator 40 and its inverting input terminal connected to the common point of the resistors 12 and 13. The potentiometers 28 and 47 are set so that, in the absence of a 100 Hz component in the light falling on to the diode 10, the comparator 50 produces a low output, but when the d.c. level at the output of the comparator 40 rises slightly in the presence of a 100 Hz component the output of the comparator 50 goes high.

The average and time constant circuit 60 includes an operational amplifier 61 the non-inverting input terminal of which is connected via a resistor 62 to the output terminal of the comparator 40, and also via a capacitor 63 to earth. The resistor 62 and capacitor 63 constitute the required average circuit and may typically have a time constant of 1 second. The inverting input terminal of the amplifier 61, which acts as a buffer with a gain of about ×4, is connected to the output terminal of the amplifier 61 by a feedback resistor 64 and to the common point of a potential divider 66, 67, connected between the rail V and earth, by a resistor 65. The output terminal of the amplifier 61 is connected by a resistor 68 to one side of a capacitor 69 the other side of which is earthed. The resistor 68 and capacitor 69 have a higher time constant typically of the order of 10 seconds. A diode 70 has its anode connected to said one side of the capacitor 69 and its cathode connected to the collector of an n-p-n transistor 71, the emitter of which is connected to the output terminal of the amplifier 61. The base of the transistor 71 is connected by a resistor 72 to said one side of the capacitor 69, and a capacitor 73 is connected between the base and emitter of the transistor 71. The time constant of the resistor 72 and capacitor 73 is of the order of 2 seconds.

The circuit 60 operates to prevent modulation of the vehicle lights (i.e. modulation of the d.c. level at the output of the circuit 60), by short term changes in light level. Thus if one lamp-post, in a series of lamp-posts giving a good light level, is not illuminated, although the voltage at the output terminal of the amplifier 61 will fall, the voltage on the capacitor 69 will not fall significantly because of the light time constant of 68, 69. The capacitor 73 does not charge to a sufficient voltage during the period when the illumination level is abnormally low to switch on transistor 71. When the vehicle passes from a well lit area to a badly lit area, however the voltage at the output terminal of the amplifier 61 will fall to and remain at a new low level. After the delay introduced by the timer means constituted by the resistor 72 and capacitor 73, the transistor 71 will switch on and discharge the capacitor 69 rapidly to the new low level. The transistor 71 is ineffective in the situation where the light level is improving, so that the time constant for a rising output level is governed only by the resistor 68 and the capacitor 69.

An operational amplifier 80 connected as a voltage follower connects the output terminal of the circuit 60 to a discrete component clamp circuit which includes a pair of n-p-n transistors 81, 82 connected as a differential pair with a common emitter resistor 83 connected to earth. The collectors of the transistors 81, 82 are connected by respective resistors 84, 85 to an unstabliised supply rail $V_B$. The base of the transistor 81 is connected by a resistor 86 to the rail $V_B$ and by a resistor 87 to the common point of a potential divider 88, 89 connected between the rail V and earth. The base of the transistor 82 is connected via a resistor 90 to the output terminal of the amplifier 80. The output of the differential pair 81, 82 is taken from the collector of the transistor 82 which is connected directly to the base of an n-p-n transistor 91 connected as an emitter follower with its collector connected to the rail $V_B$ and its emitter connected via a resistor 92 to earth. A zener diode 93 has its cathode connected to the rail $V_B$ and its anode connected to the emitter of the transistor 91. A feedback resistor 94 is connected between the emitter of the transistor 91 and the base of the transistor 82.

The zener diode 93 sets the minimum voltage at the emitter of the transistor 91. When the voltage at the output of the amplifier 80 is high the transistor 82 will be turned hard on and transistor 91 will thus switch off or conduct only weakly, the voltage at its emitter being determined by the zener diode 93. As the output voltage from amplifier 80 decreases the transistor 82 conducts less, progressively turning on the transistor 91 to raise the output voltage above the minimum set by the zener diode. The resistor 94 provides negative feedback fixing the d.c. gain of the circuit at approximately ×4. At low output voltage from the amplifier 80 the transistor 82 turns off completely so that the transistor 91 saturates.

The output of the amplifier 50 is connected to the base of a p-n-p transistor 95 via a resistor 96 and a diode 97 in series. The collector of the transistor 95 is connected to the emitter of the transistor 91 and its emitter is connected to the rail $V_B$. When the output of the comparator 50 goes low, the transistor 95 turns on and saturates.

For actually controlling the vehicle headlamps 100, 101, there are two drive circuits which are identical. The drive circuit for the headlamp 100 is described, but the other drive circuit is shown in the drawing with reference numerals one higher than those for the described drive circuit.

The lamp 100 is connected between the rail $V_B$ and the collector of an output transistor 102, the emitter of which is grounded. A resistor 104 is connected between the emitter and base of the transistor 102, the base of which is connected to the emitter of a driver transistor 106 the collector of which is connected to the rail $V_B$ by a resistor 108. A resistor 110 connects the base of the transistor 102 to the base of the transistor 106 which is also connected by a capacitor 112 to its own collector. A resistor 114 connects the base of the transistor 106 to the output terminal of an operational amplifier 116, connected as a non-inverting amplifier. A resistor 118 connects the non-inverting input terminal of the amplifier 116 to the emitter of the transistor 91, and the inverting input terminal of the amplifier 116 is connected via a resistor 120 to its output terminal and by a resistor 122 to a reference point 124 common to both driver circuits. The reference point 124 is connected to the anode of a zener diode 125 having the same breakdown voltage as the zener diode 93, and having its cathode connected to the rail $V_B$ and its anode connected by a resistor 126 to earth. The resistors 120 and 122 are chosen to give a high loop gain, but overall voltage gain is determined by a feedback resistor 127 connected between the collector of the transistor 102 and the non-inverting input terminal of the amplifier 116. In the example described an overall voltage gain of unity is employed for this stage.

It will be appreciated now that the circuit described normally operates with a very long time constant set by the resistor 68 and capacitor 69 so that short term fluctuations in light level are virtually ignored. When passing from good lighting to poor lighting, however, the headlamp brightness is raised quickly after a delay determined by the resistor 72 and capacitor 73. When passing from a lit area to an unlit area, the detector circuit around amplifier 50 immediately overrides the average and time constant circuit and switches the headlamps to full brightness.

Turning now to FIG. 2, the system shown includes exactly the same detector, a.c. amplifier, 100 Hz filter and full wave rectifier, and smoothing filter feeding a terminal A shown in both Figures. In addition the same "loss of 100 Hz" detector is employed (with the exception that the connections to the inverting and non-inverting input terminals are interchanged and the diode in the output is reversed) and feeds a terminal B shown in both Figures. As before terminal A is connected to the average and time constant circuit 60. The output of this circuit 60 is applied to the non-inverting input terminal of an operational amplifier 130 to the output terminal of which the cathode of a diode 131 is connected. The anode of the diode 131 is connected to the common point of a potential divider 132, 133 and also to the inverting input terminal of the amplifier. The voltage of the common point of the potential divider 132, 133 has a maximum level set by the values of the resistors 132, 133, but when the output of the circuit 60 is less than this maximum the amplifier acts as a voltage follower.

The common point of the potential divider 132, 133 is connected by a resistor 134 to the inverting input terminal of a voltage comparator 135. The non-inverting input terminal of the comparator 135 is connected by a resistor 136 to the one side of a capacitor 137 forming the timing capacitor of a triangular wave generator based on a voltage comparator 138. The other side of the capacitor 137 is earthed and said one side is connected by a resistor 139 to the inverting input terminal of the comparator 138 and by a resistor 140 to the output terminal of the comparator 138. This output terminal is connected by a resistor 141 to the inverting input terminal of the comparator which is also connected by a resistor 142 to the common point of a potential divider 143, 144 connected between the rail V and earth. The resistor 141 alters the reference voltage at the inverting input terminal of the comparator according to whether the comparator output is high or low. The comparator acts as a constant current source to charge or discharge the capacitor 137 the voltage on which therefore swings uniformly between two limits determined by the two reference voltage levels.

The output of the comparator 135 is connected by a resistor 150 to the base of a Darlington pair 151, the collector of which is connected to the rail $V_B$ by a resistor 152 and the emitter of which is connected to a lamp switching circuit (not shown).

The circuit shown in FIG. 2 provides mark-space ratio control of the headlamp brightness within a control band defined by the potential divider 132, 133 and the lower limit of the voltage swing on capacitor 137. Within this control band the output mark-space ratio is determined by the voltage applied to the inverting input terminal of the comparator 135, the lamps being switched on whenever the voltage at the inverting input terminal is less than that at the non-inverting input terminal. When the voltage at the common point of the potential divider 132, 133 is at its maximum, the lamps are switched on for a minimum period in each cycle of the triangular wave generator. When the output of the "loss of 100 Hz" detector goes high on loss of the 100 Hz signal, the d.c. signal applied to the capacitor 137 will stop this charging and discharging and a constant high signal will be applied to the non-invert terminal of the comparator 135, so that the lamps are switched on continuously. It will be appreciated that, although both examples described above utilize analogue circuits for producing the control signal for modulating the headlamp current, it is within the scope of this invention to utilize circuits which are partially digital, e.g. by converting the output of the filter 40 to a variable frequency signal and carrying out the functions of the average and time constant circuit by means of counters and logic gates.

We claim:

1. A vehicle headlamp control circuit including an incident light detector element and means responsive to only the a.c. component of the detection element output at a frequency related to the street lighting main electricity supply frequency in the locality in which the circuit is intended to be used, characterised by including an averaging circuit for providing a control signal in accordance with the average value of said a.c. component whereby the vehicle lighting is controlled in accordance with the average value of the magnitude of the amplitude of the a.c. component.

2. A vehicle headlamp control circuit as claimed in claim 1, wherein the averaging circuit has a predetermined time constant, a further time constant circuit driven by the averaging circuit and having a significantly longer time constant, and means for bypassing said further time constant circuit when the control signal continues to fall for a period in excess of a predetermined delay.

3. A vehicle headlamp control circuit as claimed in claim 2 further comprising a detection circuit arranged to detect when the amplitude of the a.c. component falls below a set level and to override the averaging circuit to increase the headlamp intensity without delay.

4. A vehicle headlamp control circuit comprising an incident light detector element, an a.c. amplifier for amplifying the output of said detector element, a band pass filter circuit connected to said amplifier and tuned to twide the frequency of the street lighting electricity mains supply in the locality in which it is intended to use the control circuit, rectifier means connected to the filter circuit and providing a d.c. output signal fluctuating in accordance with the amplitude of said a.c. component, an averaging circuit connected to the rectifier means and providing a d.c. signal related to the average amplitude of the a.c. signal, and modulating means connected to the averaging circuit and controlling the vehicle headlamp current in accordance with output of said averaging circuit.

5. A vehicle headlamp control circuit as claimed in claim 4 in which there is a time constant circuit interposed between the averaging circuit and the modulating means and having a time constant substantially longer than that of the averaging circuit, switch means for by-passing the time constant circuit, and timer means for operating said switch means for by-passing the time constant circuit whenever the output of the averaging circuit continues to fall for longer than a predetermined period.

6. A vehicle headlamp control circuit as claimed in claim 5 in which the averaging circuit comprises an R.C input stage and a buffer amplifier stage, the time constant circuit comprises a further R.C stage, the switch means comprises a transistor having its collector-emitter in series with a diode across the resistor of said further R.C stage, and the timer means comprises a resistor and a capacitor in series across the resistor of said further R.C stage with said capacitor across the base-emitter of the transistor.

7. A vehicle headlamp control circuit as claimed in claim 6 further comprising a comparator connected to compare the output of said rectifier means with a reference signal and connected to said modulating means to override the averaging circuit and provide maximum headlamp brightness when the utput of said rectifier means falls below a level determined by said reference signal.

8. A vehicle headlamp control circuit as claimed in claim 4 in which said rectifier means includes a smoothing filter.

9. A vehicle headlamp control circuit as claimed in claim 4 in which the modulating means comprises an analogue modulator varying continuous current through the headlamps.

10. A vehicle headlamp control circuit as claimed in claim 4 in which the modulating means is a mark to space ratio modulator varying the average current through the headlamps.

* * * * *